Sept. 5, 1950     A. E. BENSON     2,521,143
TIRE BUILDING APPARATUS
Filed Dec. 29, 1947
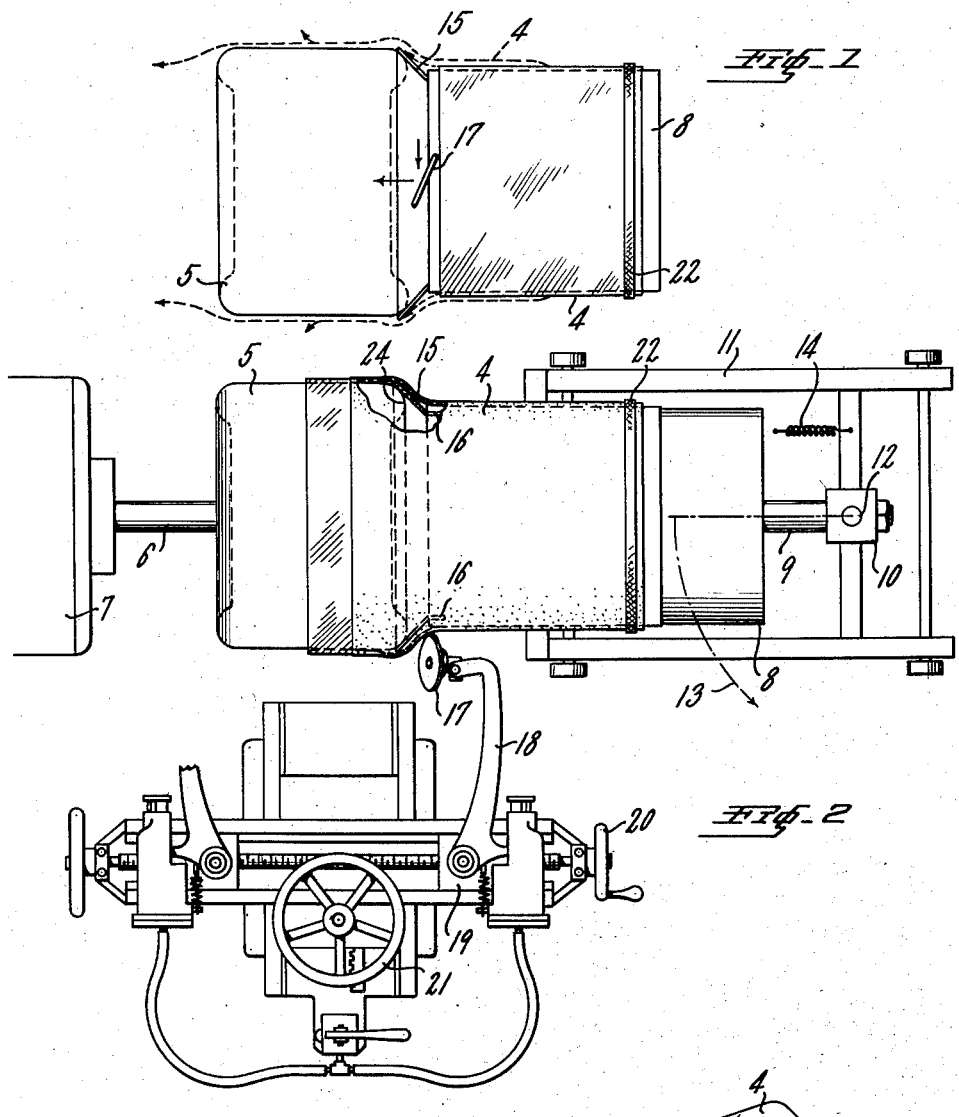
INVENTOR.
ARTHUR E. BENSON
BY Henry P. Truesdell
ATTORNEY Patented Sept. 5, 1950

2,521,143

UNITED STATES PATENT OFFICE 2,521,143

TIRE BUILDING APPARATUS

Arthur E. Benson, Detroit, Mich., assignor to United States Rubber Company, New York, N. Y., a corporation of New Jersey Application December 29, 1947, Serial No. 794,265

3 Claims. (Cl. 154—9)

My invention relates to tire building apparatus and more particularly to apparatus for building wire tires.

In the manufacture of large size pneumatic tires by the so-called "drum method," the textile fabric plies are first assembled in the form of an endless band or pocket, which may comprise two or more plies, and the endless pockets are then applied to the tire building drum by axial movement across the face of the rotating drum. The requisite number of plies, the breakers, the bead wires and tread stock are assembled and built into the tire on the tire building drum and the completed tire removed as an endless band for subsequent shaping and vulcanizing into a finished tire. In applying this method to tires utilizing wire fabric it has been difficult for the workman to place the large wire pockets on the tire building drum due to their considerably heavier weight and greater area. Moreover, in working the pockets onto the drum by conventional hand methods employed with textile fabric plies, there was danger of kinking the wire cord of the fabric and the sharp cut edges of the wire fabric plies presented a hazard to the workman. These difficulties have been overcome by my invention which provides a structure on which the individual wire fabric pocket is initially mounted together with means for transferring the pocket to the building drum quickly and safely.

Therefore, it is an object of my invention to provide a new and improved apparatus for building wire tires.

Another object of my invention is the provision of means for quickly and safely applying a pocket of wire tire fabric to a tire building drum.

In the accompanying drawing, Fig. 1 is a schematic drawing of my apparatus illustrating the principles of operation; Fig. 2 is a plan view of one practical form of the tire building apparatus constructed in accordance with my invention; Fig. 3 is a perspective view of one type of wire tire fabric with which my invention can be used; and Fig. 4 is a perspective view of a pocket made of wire fabric plies.

Referring to the drawing, Fig. 3 illustrates wire tire fabric 1 with which my invention is particularly adapted to be used although it may be used with tire fabric using other material such as textile cord. The wire fabric comprises a plurality of wire cords 2 each consisting of a number of wire filaments twisted together into cord or rope form. Thereafter, the cords are calendered with sheets of rubber stock so that in completed form the wire cords are completely embedded in rubber. Sheets of the wire tire fabric are cut on the bias and are assembled into the form of an endless band or pocket 4, as illustrated by Fig. 4. The pocket may be made up of any chosen number of plies of the tire fabric, depending upon the particular construction of the tire being manufactured. The pocket may be built up on a cylinder of the required diameter and width before being placed in position on the tire building apparatus.

Such apparatus includes a tire building drum 5, illustrated by Fig. 2, and which is carried by a rotating shaft 6 extending from a driving mechanism or motor 7. The drum 5 may be rotated in either direction at varying speeds in accordance with conventional practice. In building large wire tires, one of the problems has been accurately to place the pocket 4 in position on the tire building drum 5. If the pocket were made of conventional fabric employing textile cord, the workman would simply extend his arms through the pocket, slip it over the tire building drum as far as it would go, and then work the pocket onto the drum by means of a spading tool as the tire building drum rotates. However, when this method of assembly is attempted with pockets of wire fabric a number of difficulties have arisen. In the first place, the individual pockets may weigh up to 100 pounds or more for large size tires and are large, heavy and awkward to place in position on the tire building drum. In addition, some hazard is involved for the workman due to the sharp cut ends of the wire cord appearing at the edge of the tire fabric. The wire fabric pocket being very stiff and rigid does not stretch easily in applying it to the building drum unless high rotational speeds are used which further adds to the difficulties of the workman in handling the large heavy pocket. Lastly, if the pocket is worked onto the drum by conventional hand methods using a spading tool there is some danger that the wire cables in the fabric may become kinked or bent and which may subsequently cause a weak spot to appear in the completed tire. All of these disadvantages in manufacture are eliminated by my invention which provides means for quickly mounting the pocket onto the tire building drum.

To this end, I provide a second or auxiliary drum 8 which is mounted for rotation on a shaft 9 carried by a supporting block 10 mounted on a carriage 11. The auxiliary drum is of slightly smaller diameter than the pocket diameter. In order to facilitate mounting the pocket 4 on the auxiliary drum, the drum and its supporting block are pivoted on a shaft 12 so that the drum may be swung and moved in the direction of the arrow 13 away from the building drum 5. The carriage 11 itself is mounted on a plurality of wheels, and a tension spring 14 extends between the carriage and the floor on which the carriage rests to hold the auxiliary drum against the tire building drum.

In order to provide a path of travel between the auxiliary drum and the tire building drum, the auxiliary drum carries a cone 15 which is adapted to engage the shoulder of the building drum, in the manner illustrated in Figs. 1 and 2. Since the cone is held in frictional engagement with the building drum by the spring 14 the auxiliary drum 8 is rotated on the shaft 9 at the same speed as the building drum. It should be manifest, however, that separate motor drive means may be provided to rotate the auxiliary drum. To permit placement of the pocket on the auxiliary drum, the cone 15 may be readily removed from the auxiliary drum; it is held in position on the drum by a plurality of spring fingers 16 which frictionally engage the inner surface of the drum. Since the auxiliary drum is of smaller diameter than the building drum, the cone 15 provides a beveled or inclined surface over which the pocket may travel as it is moved from the auxiliary drum onto the larger diameter of the tire building drum.

To move the pocket from the auxiliary drum to the building drum, a large stitcher wheel 17 is employed and is adapted to engage the surface of the pocket as the pocket rotates. As illustrated in Fig. 1, the stitcher wheel is located at an angle of some 15 to 30° to the vertical in a plane parallel to the axes of rotation of the drums. As the pocket is rotated at high speed on the auxiliary drum it is frictionally engaged by the stitcher wheel. Since the wheel is disposed at an angle to the vertical it produces a lateral or axial component of frictional force on the pocket which moves it laterally from the auxiliary drum over the pathway provided by the cone 15 onto the building drum. The stitcher wheel is of relatively large diameter, preferably from 8 to 12 inches, and is provided with a wide face at its rim so that there is no tendency to scuff or tear off the rubber skim coats of the wire fabric. The relatively large diameter wheel also prevents any localized kinking or stretching of the wire cords in the ply fabric. The stitcher wheel 17 forms part of a conventional apparatus for stitching tires and which itself comprises no part of the present invention. Such apparatus is disclosed in Patent 2,161,117, issued on June 6, 1939, to G. F. Wikle and assigned to the same assignee as the instant application. To provide for adjustment of the stitcher wheel relative to the pocket and tire building drum it is carried on an arm 18 pivotally mounted on a carriage 19. The carriage may be moved laterally along the axes of the drums by means of the hand wheel 20, and toward and away from the drums by means of the wheel 21, by means of mechanism more fully described in the Wikle Patent 2,161,117.

In building a wire tire with my apparatus, the pocket 4 is first slipped onto the auxiliary drum 8. This is easily done because the drum is of a slightly smaller diameter than the unstretched pocket diameter so that there is no necessity for stretching the pocket onto the drum. Alternatively, the pocket 4 may be built up directly on the drum 8, the number and arrangement of the wire fabric plies depending upon the particular tire construction. A temporary strip 22 of gummed tape is next wound around one end of the pocket as indicated to hold it more closely in contact with the auxiliary drum and to prevent radial expansion of that end of the pocket as the pocket is rotated at high speed. This limits expansion of one end of the pocket and eliminates undue vibration caused by eccentric expansion of the pocket which might occur if the pocket were free to leave the drum surface. Thereafter, the cone 15 is mounted on the drum 8 and the assembly swung and moved into position so that the cone rests against the drum shoulder 24 of the building drum. It should be noted that the cone 15 is designed to engage the outer edge of the shoulder in a position such that it will prevent the pocket from rubbing against the tire building drum shoulder. This means that a coating of adhesive material may be placed on the shoulder surface for the purposes of adhering the first ply to the drum shoulder when the pocket is stitched down to receive the tire bead construction; since the adhesive coating is protected by the cone 15 it does not interfere with the application of the pocket to the tire building drum.

The tire building drum is now rotated at relatively high speed by means of the driving mechanism 7 and rotates the auxiliary drum 8 at the same speed due to the frictional engagement of the cone 15 with the building drum. As the speed of the pocket increases, the centrifugal force induced in the heavy pocket causes it to expand to a diameter approaching that of the building drum 5. The forward half of the pocket is expanded or stretched away from the surface of the auxiliary drum although the rear portion still tends to engage the drum due to the clamping or anchoring action of the gummed strip 22. The stitcher wheel 17 is now moved into a position such that it engages the surface of the pocket at approximately the base of cone 15.

As the pocket rotates at high speed in engagement with the stitcher wheel 17 the centrifugal forces produced in the pocket are translated in part by the wheel into axial or lateral forces moving the pocket up and across the cone onto the building drum. The required centrifugal forces in the pocket are such that, in most instances, the pocket does not actually engage the entire surface of the cone 15 but rather is stretched to a diameter such that it moves easily over the outer edge of the cone onto the surface of the building drum. Movement of the pocket onto the building drum is indicated by the dotted lines and arrows of Fig. 1. When the pocket is approximately two-thirds in position on the building drum, the gummed tape 22 is removed thereby releasing the pocket from engagement with the auxiliary drum 8 so that it can be moved into final position on the tire building drum. In this way, heavy pockets of wire fabric may be quickly and easily mounted in position on the building drum.

Having thus described my invention, what I claim and desire to protect by Letters Patent is:

1. In a tire building apparatus, a rotatable tire building drum for receiving an endless pocket of ply fabric, an auxiliary drum of smaller diameter than the pocket for carrying the pocket, a cone carried by the auxiliary drum and engaging the building drum for rotation therewith, said cone providing an inclined surface between the auxiliary and building drums, and a stitcher wheel disposed at an angle to the axes of rotation of said drums for engaging the pocket to move it laterally over said inclined surface onto the building drum.

2. In a tire building apparatus, a rotatable tire building drum for receiving a pocket of ply fabric, a second drum of smaller diameter than the building drum for carrying the pocket, means carried by the second drum and providing a path of travel for the pocket from the second drum to the building drum, means for rotating the second drum with the building drum, and a stitcher wheel disposed at an angle to the axes of rotation of said drums for engaging the pocket to move it laterally onto the building drum upon rotation of the drums.

3. In a tire building apparatus, a rotatable tire building drum for receiving a pocket of tire fabric, a second drum of smaller diameter than the building drum for carrying the pocket, a cone carried by the second drum, means for moving the second drum to a position such that the cone engages the building drum for rotation therewith, and a stitcher wheel disposed at an angle to the axis of rotation of the pocket for engaging the pocket to move it laterally over said cone onto the building drum.

ARTHUR E. BENSON.

REFERENCES CITED

The following references are of record in the file of this patent:

UNITED STATES PATENTS

| Number | Name | Date |
|---|---|---|
| 1,751,873 | Merz | Mar. 25, 1930 |
| 1,887,187 | Pfeiffer | Nov. 8, 1932 |
| 2,161,117 | Wikle | June 6, 1939 |